US012620093B2

(12) United States Patent
Wang et al.

(10) Patent No.: US 12,620,093 B2
(45) Date of Patent: May 5, 2026

(54) METHOD AND APPARATUS FOR ALLOCATING IMAGE PROCESSING

(71) Applicant: GE Precision Healthcare LLC, Waukesha, WI (US)

(72) Inventors: Huayi Wang, Beijing (CN); Haibo Mei, Beijing (CN); Jingliang Tian, Beijing (CN); Tao Wang, Beijing (CN)

(73) Assignee: GE Precision Healthcare LLC, Waukesha, WI (US)

( * ) Notice: Subject to any disclaimer, the term of this patent is extended or adjusted under 35 U.S.C. 154(b) by 346 days.

(21) Appl. No.: 18/472,515

(22) Filed: Sep. 22, 2023

(65) Prior Publication Data

US 2024/0119591 A1     Apr. 11, 2024

(30) Foreign Application Priority Data

Sep. 22, 2022     (CN) .......................... 202211155704.7

(51) Int. Cl.
*G06T 7/00* (2017.01)

(52) U.S. Cl.
CPC .. *G06T 7/0012* (2013.01); *G06T 2207/20081* (2013.01); *G06T 2207/20084* (2013.01); *G06T 2207/30004* (2013.01)

(58) Field of Classification Search
CPC ......... G06T 7/0012; G06T 2207/20081; G06T 2207/20084; G06T 2207/30004
See application file for complete search history.

(56) References Cited

U.S. PATENT DOCUMENTS

| | | | | |
|---|---|---|---|---|
| 2020/0125900 A1* | 4/2020 | Posner | ................ | G06F 18/2433 |
| 2021/0125329 A1* | 4/2021 | Zachmann | ................ | G06N 5/04 |
| 2023/0030595 A1* | 2/2023 | Sun | ...................... | G06V 10/776 |
| 2023/0061998 A1* | 3/2023 | Yang | ........................ | G06N 3/08 |
| 2023/0206437 A1* | 6/2023 | Zachmann | .......... | G06F 9/45558 |
| | | | | 382/155 |
| 2023/0268068 A1* | 8/2023 | Doyen | ................... | G16H 50/50 |
| | | | | 705/2 |

FOREIGN PATENT DOCUMENTS

| | | |
|---|---|---|
| CN | 109583576 A | 11/2020 |
| CN | 109410188 A | 6/2021 |
| CN | 114600119 A | 6/2022 |
| CN | 114730488 A | 7/2022 |

* cited by examiner

*Primary Examiner* — Van D Huynh

(57) ABSTRACT

The present application provides a method, a non-transitory computer-readable storage medium, and apparatus for allocating image processing. The method for allocating image processing can include, on the basis of relevant information of a medical image, selecting, according to an allocation list, a learning network model corresponding to the information from a plurality of learning network models. The method can also include performing image processing on the medical image on the basis of the selected learning network model, the allocation list including a list of correspondences between relevant information of medical images and the plurality of learning network models.

18 Claims, 7 Drawing Sheets

200

400

| DICOM file | |
|---|---|
| Device type | CT |
| Scan site | Lung |
| Possible disease type | Pulmonary nodule |
| ...... | ...... |
| ...... | ...... |

| Allocation list | |
|---|---|
| Relevant information | Learning network model |
| MR + Lung<br>MR + Chest | MR chest processing model |
| CT + Chest | CT chest processing model |
| CT + Brain<br>CT + Brain tumor | CT brain processing model |
| X-ray + Chest<br>X-ray + Chest radiograph | X-ray chest processing model |
| X-ray + Lower limb<br>X-ray + Bone age | X-ray bone age processing model |
| ...... | ...... |
| ...... | ...... |

600

| On the basis of relevant information of a medical image, select, according to an allocation list, a learning network model corresponding to the information from a plurality of learning network models | 610 |

↓

| Perform image processing on the medical image on the basis of the selected learning network model | 620 |

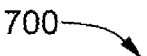

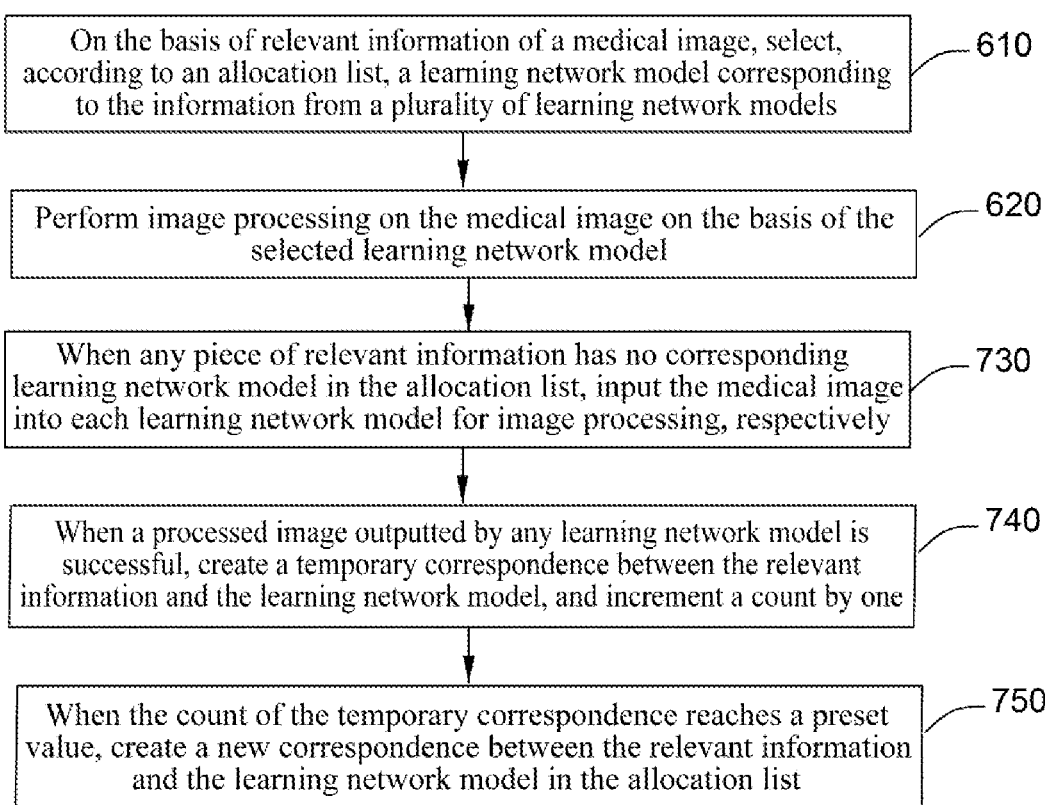

| On the basis of relevant information of a medical image, select, according to an allocation list, a learning network model corresponding to the information from a plurality of learning network models | 610 |

| Perform image processing on the medical image on the basis of the selected learning network model | 620 |

| When any piece of relevant information has no corresponding learning network model in the allocation list, input the medical image into each learning network model for image processing, respectively | 730 |

| When a processed image outputted by any learning network model is successful, create a temporary correspondence between the relevant information and the learning network model, and increment a count by one | 740 |

| When the count of the temporary correspondence reaches a preset value, create a new correspondence between the relevant information and the learning network model in the allocation list | 750 |

FIG. 7

METHOD AND APPARATUS FOR ALLOCATING IMAGE PROCESSING

CROSS-REFERENCE TO RELATED APPLICATIONS

The present matter claims priority to Chinese Patent Application 202211155704.7, filed Sep. 22, 2022, the contents of which are incorporated by reference herein.

TECHNICAL FIELD

The present invention relates to medical image processing, and in particular, to a method, a non-transitory computer-readable storage medium, and apparatus for allocating image processing.

BACKGROUND

In general, medical imaging devices comprise computed tomography (CT) systems, magnetic resonance imaging (MRI) systems, X-ray imaging systems and the like, all of which are capable of acquiring medical images. However, in order to assist diagnosis, image processing, e.g., image segmentation, image post-processing and the like, of the images is usually required.

In general, after a medical image is acquired, image processing of the medical image is performed directly in the medical imaging device. However, with increasing demand for assisted diagnosis, the amount of computing and the time required for image processing by utilizing medical imaging devices are both gradually increasing, such that the usage rate of the imaging devices has been reduced, and the number of patients scanned per day has also decreased.

SUMMARY

The present invention provides a method, a non-transitory computer-readable storage medium, and apparatus for allocating image processing.

An exemplary embodiment of the present invention provides a method for allocating image processing, comprising: on the basis of relevant information of a medical image, selecting, according to an allocation list, a learning network model corresponding to the information from a plurality of learning network models, the allocation list comprising a list of correspondences between relevant information of medical images and the plurality of learning network models; and performing image processing on the medical image on the basis of the selected learning network model.

An exemplary embodiment of the present invention further provides a non-transitory computer-readable storage medium, which is used to store a computer program that, when executed by a computer, causes the computer to execute instructions for the method for allocating image processing described above.

An exemplary embodiment of the present invention further provides an image processing apparatus, the image processing apparatus comprising: a plurality of learning network models, a memory, and a processor, the plurality of learning network models being used to perform image processing on a medical image, the memory being used to store an allocation list, the allocation list comprising a list of correspondences between relevant information of medical images and the plurality of learning network models, the processor being used to, on the basis of the relevant information of the medical image, select, according to the allocation list, a learning network model corresponding to the information from the plurality of learning network models, and perform image processing on the medical image on the basis of the selected learning network model.

Other features and aspects will become apparent from the following detailed description, drawings, and claims.

BRIEF DESCRIPTION OF THE DRAWINGS

The present invention can be better understood by means of the description of the exemplary embodiments of the present invention in conjunction with the drawings, in which:

FIG. 7 is a flowchart of a method for allocating image processing according to some other embodiments of the present invention.

DETAILED DESCRIPTION

Specific embodiments of the present invention will be described below. It should be noted that in the specific description of said embodiments, for the sake of brevity and conciseness, the present description cannot describe all of the features of the actual embodiments in detail. It should be understood that in the actual implementation process of any embodiment, just as in the process of any engineering project or design project, a variety of specific decisions are often made to achieve specific goals of the developer and to meet system-related or business-related constraints, which may also vary from one embodiment to another. Furthermore, it should also be understood that although efforts made in such development processes may be complex and tedious, for a person of ordinary skill in the art related to the content disclosed in the present invention, some design, manufacture, or production changes made on the basis of the technical content disclosed in the present disclosure are only common technical means, and should not be construed as the content of the present disclosure being insufficient.

Unless defined otherwise, technical terms or scientific terms used in the claims and description should have the usual meanings that are understood by those of ordinary skill in the technical field to which the present invention belongs. The terms "first" and "second" and similar terms used in the description and claims of the patent application of the present invention do not denote any order, quantity, or importance, but are merely intended to distinguish between different constituents. The terms "one" or "a/an" and similar terms do not express a limitation of quantity, but rather that at least one is present. The terms "include" or "comprise" and similar words indicate that an element or object preceding the terms "include" or "comprise" encompasses elements or objects and equivalent elements thereof listed after the terms "include" or "comprise," and do not exclude other elements or objects. The terms "connect" or "link" and similar words are not limited to physical or mechanical connections, and are not limited to direct or indirect connections.

Figure 1:
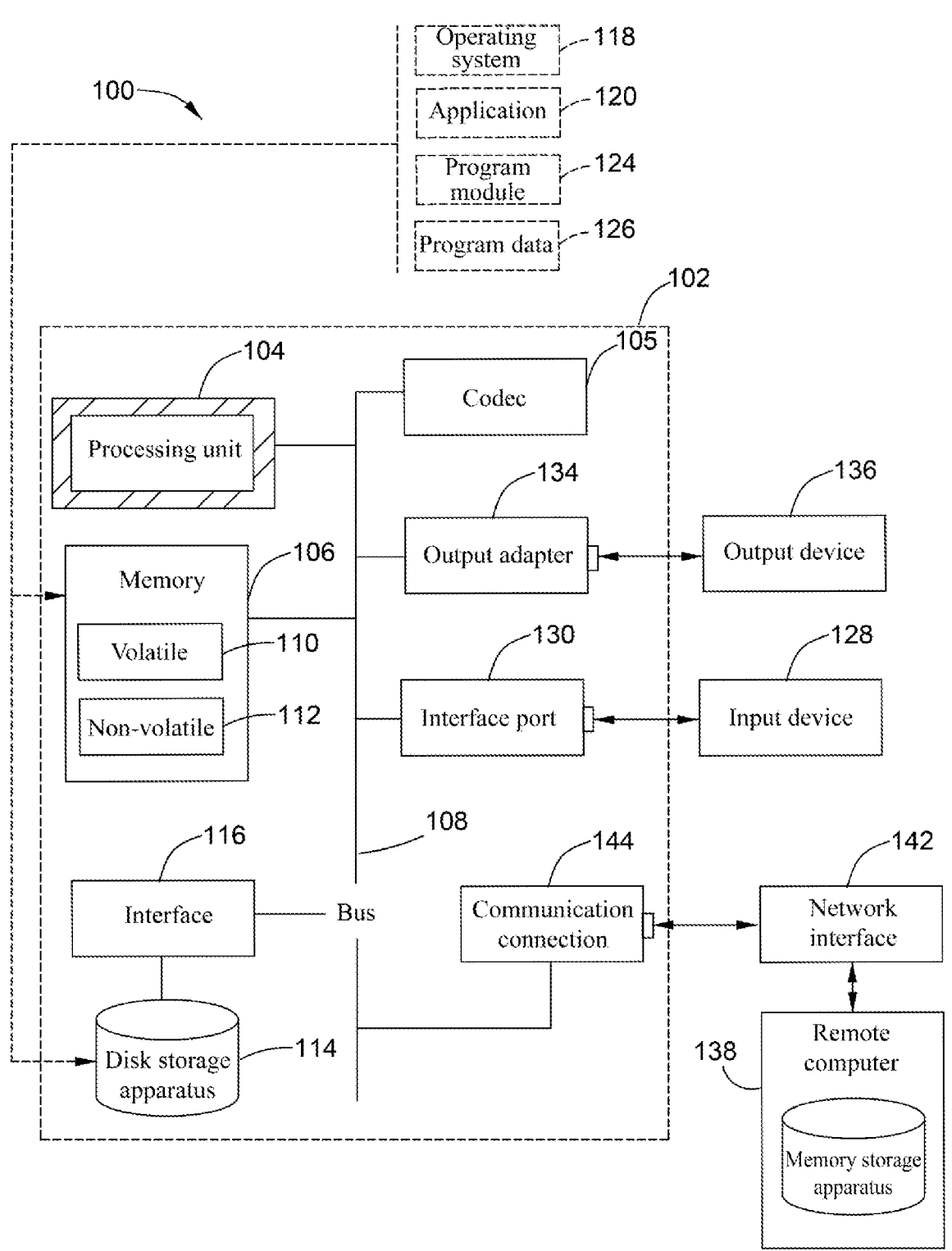
FIG. 1 is a schematic diagram of an operating environment according to some embodiments of the present invention.

FIG. 1 shows a schematic diagram of an operating environment 100 of some embodiments. As shown in FIG. 1, the operating environment 100 includes a computer 102. The computer 102 includes a processing unit 104, a system memory 106, a codec 105, and a system bus 108. The system bus 108 couples system components (including, but not limited to, the system memory 106) to the processing unit 104.

The processing unit 104 may be any of a variety of available processors. A dual microprocessor and other multiprocessor architectures can also be used as the processing unit 104.

The system bus 108 may be any of several types of bus structure, including a memory bus or a memory controller, a peripheral bus or an external bus, and/or a local bus using any available bus architecture, said bus architectures including, but not limited to, industry standard architecture (ISA), micro-channel architecture (MSA), extended ISA (EISA), intelligent drive electronics (IDE), a VESA local bus (VLB), a peripheral component interconnect (PCI), an insert bus, a universal serial bus (USB), an advanced graphics port (AGP), a personal computer memory card international association bus (PCMCIA), Firewire (IEEE 104), and a small computer system interface (SCSI).

The system memory 106 includes a volatile memory 110 and a non-volatile memory 112. A basic input/output system (BIOS) (comprising basic routines that transmit information between elements within the computer 102, such as during startup) is stored in the non-volatile memory 112.

Additionally, the codec 105 may include at least one among an encoder or a decoder, wherein the at least one among the encoder or decoder may include hardware, a combination of hardware and software, or software. While the codec 105 is depicted as a separate component, the codec 105 may be included within the non-volatile memory 112. By way of example and not limitation, the non-volatile memory 112 may include a read-only memory (ROM), a programmable ROM (PROM), an electrically programmable ROM (EPROM), an electrically erasable programmable ROM (EEPROM), or a flash memory. The volatile memory 110 includes a random access memory (RAM) that acts as an external cache memory. By way of example and not limitation, RAM is available in many forms, such as static RAM (SRAM), dynamic RAM (DRAM), synchronous DRAM (SDRAM), double data rate SDRAM (DDRS-DRAM), and enhanced SDRAM (ESDRAM).

The computer 102 may further include removable/non-removable and volatile/non-volatile computer storage media. FIG. 1 illustrates a disk storage apparatus 114, for example. The disk storage apparatus 114 includes, but is not limited to, a device such as a magnetic disk drive, a solid state disk (SSD), a floppy disk drive, a tape drive, a Zip drive, a flash card, or a memory stick. Additionally, the disk storage apparatus 114 may include a storage medium alone or in combination with other storage media, the other storage media including, but not being limited to, optical disk drives, such as a compact disk ROM device (CD-ROM), a CD recordable drive (CD-R drive), a CD rewritable drive (CD-RW drive), or a digital versatile disk ROM drive (DVD-ROM). To facilitate the connection of the disk storage device 114 to the system bus 108, a removable or non-removable interface, such as an interface 116, is usually used.

It will be appreciated that FIG. 1 depicts software that acts as an intermediary between a user and a basic computer resource described in the suitable operating environment 100. Such software includes an operating system 118. The operating system 118, which may be stored on the disk storage apparatus 114, is used to control and allocate resources of the computer 102. An application 120 utilizes the management of resources by the operating system 118 by means of program modules 124 and program data 126 (such as initiating/closing transaction tables, etc.) stored in the system memory 106 or on the disk storage apparatus 114. It will be appreciated that the subject matter set forth may be implemented using various operating systems or combinations of operating systems.

A command or information is inputted into the computer 102 by the user by means of one or more input devices 128. The input device 128 includes, but is not limited to, a pointing device such as a mouse, a trackball, a stylus, a touchpad, etc., a microphone, a joystick, a gamepad, a satellite dish, a scanner, a television tuner card, a digital camera, a digital video camera, a network camera, a microphone, and the like. These and other input devices are connected to the processing unit 104 by means of the system bus 108 via one or more interface ports 130. The one or more interface ports 130 include, for example, serial ports, parallel ports, game ports, and universal serial buses (USBs).

One or more output devices 136 use ports of the same type as that of the one or more input devices. Thus, for example, USB ports can be used to provide an input to the computer 102, and output information from the computer 102 to the output device 136. An output adapter 134 is provided to illustrate that there are some output devices 136 that require special adapters, such as monitors, speakers, printers and other output devices 136. By way of example and not limitation, the output adapter 134 includes a graphics card and a sound card that provide a means of connection between the output device 136 and the system bus 108. It should be noted that other devices and/or systems of devices simultaneously provide input and output capabilities, such as one or more remote computers 138.

The computer 102 may operate in a networked environment by using logical connections to one or more remote computers (such as the one or more remote computers 138). The one or more remote computers 138 may be a personal computer, a server, a cloud, a router, a network PC, a workstation, a microprocessor-based appliance, a peer-to-peer device, a smart phone, a tablet, or other network node, for example, a medical picture archiving and communication system (PACS), and generally may include a number of elements described with respect to the computer 102. For brevity, only a memory storage device 140 is shown with the one or more remote computers 138. The one or more remote computers 138 are logically connected to the computer 102 by means of a network interface 142, which is then connected by means of one or more communication connections 144. The network interface 142 encompasses a wired and/or a wireless communications network, such as a local area network (LAN) and a wide area network (WAN), and a cellular network. LAN technology includes a fiber distributed data interface (FDDI), a copper distributed data interface (CDDI), Ethernet, a Token Ring, and the like. WAN technology includes, but is not limited to, a point-to-point link, a circuit-switched network such as an integrated services digital network (ISDN) and variants thereof, a packet-switched network, and a digital subscriber line (DSL).

The one or more communication connections 144 refer to hardware/software for connecting the network interface 142 to the bus 108. Although the communication connection 144 is shown inside of the computer 102 for clarity, it may also be located outside of the computer 102. For exemplary purposes only, the hardware/software required for connecting to the network interface 142 includes internal and external technology, such as a modem, including a conventional telephone-grade modem, a cable modem and a DSL modem, an ISDN adapter, wired and wireless Ethernet cards, a hub, and a router.

The present invention proposes an apparatus capable of performing image processing on a medical image, which is independent of medical imaging systems and capable of receiving and processing various types of medical images, such as CT images, MR images, X-ray images, PET images, ultrasound images, and the like, and performing various types of image processing. For example, operations can be performed, such as image segmentation, image feature extraction, image rendering, image post-processing, and image editing on the medical images. Techniques can include displaying, storing, and/or transmitting the processed images. The image processing apparatus includes the operating environment as shown in FIG. 1.

Figure 2:
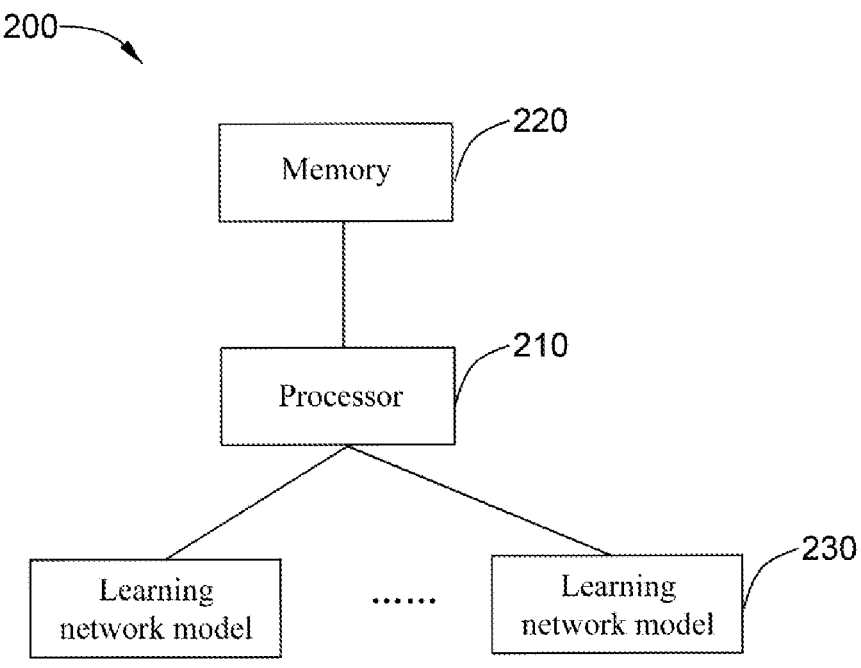
FIG. 2 is a schematic diagram of an image processing apparatus according to some embodiments of the present invention.

FIG. 2 shows a schematic diagram of an image processing apparatus of some embodiments of the present invention. As shown in FIG. 2, the image processing apparatus 200 includes a processor 210, a memory 220, and a plurality of learning network models 230.

The plurality of learning network models 230 are used to perform image processing on a medical image. The memory 220 is used to store an allocation list, wherein the allocation list includes a list of correspondences between relevant information of medical images and the plurality of learning network models. The processor 210 is used to, on the basis of relevant information of a medical image, select, according to the allocation list, a learning network model corresponding to the information from the plurality of learning network models, and perform image processing on the medical image on the basis of the selected learning network model.

Specifically, the allocation list is stored in the memory in the form of a look up table (LUT). Specifically, in addition to being capable of storing the allocation list, the memory can also store medical images and image-processed medical images. In addition to including the above modules, the image processing apparatus 200 may also include at least one interface, so as to display, by means of an external display, a medical image and a processed image, or receive or transmit the medical image or the processed image by wired or wireless means.

Specifically, the plurality of learning network models are each capable of performing image processing on different types of medical images, for example, CT images, MR images, X-ray images, and the like. A model that performs image processing on different scan sites, such as the brain and chest, of a medical image may also be included; and a model that performs different types of image processing, such as image segmentation, image optimization, and image rendering, on a medical image may also be included.

In some embodiments, the plurality of learning network models include at least two among n CT models, m MR models, and t X-ray models, wherein the n CT models are configured to perform image processing on n scan sites in a CT image, respectively, the m MR models are configured to perform image processing on m scan sites in an MR image, respectively, and the t X-ray models are configured to perform image processing on t scan sites in an X-ray image, respectively, where n, m and t are integers. For example, the plurality of learning network models may include 2 CT models, 1 MR model, and 1 X-ray model. The plurality of learning network models may also include 2 CT models, and 1 MR model; and the plurality of learning network models may also include 1 MR model and 1 X-ray model. In the present invention, there is no limitation on the number of each model, and the plurality of learning network models may include any combination of models.

Even if a specific learning network model is not present in the initial image processing apparatus, the user may add a learning network model into the image processing apparatus as needed.

The learning network model in the image processing apparatus is trained in advance and then loaded or stored into the image processing apparatus. When the user uses the image processing apparatus, an image satisfying a preset condition may be inputted into a training module of the learning network model, so as to optimize the learning network model. The image satisfying the preset condition may be an image with image processing effects of which the user considers to be good, or an image for which image quality evaluation is performed on an image-processed image by the processor, and the like. In the present invention, there is no limitation on the methods by which the learning network model is optimized.

In some embodiments, the described learning network model is obtained by training using the training module and a training data set. In some embodiments, the training module may include a first module configured to store the training data set, a second module configured to train and/or update on the basis of a model, and a communication network configured to connect the first module and the second module. In some embodiments, the first module includes a first processing unit and a first memory cell, wherein the first memory cell is configured to store the training data set, and the first processing unit is configured to receive a relevant instruction (for example, acquire a training data set) and send the training data set according to the instruction. In addition, the second module includes a second processing unit and a second memory cell, wherein the second memory cell is configured to store a training model, and the second processing unit is configured to receive a relevant instruction and perform training and/or updating of the network. In some other embodiments, the training data set may further be stored in the second memory cell of the second module, and the training system may not include the first module. In some embodiments, the communication network may include various connection types, such as wired or wireless communication links, or fiber-optic cables.

Once data (for example, a trained model) is generated and/or configured, the data can be replicated and/or loaded into the image processing apparatus 200, which may be accomplished using different means. For example, a learning network model may be loaded by means of a directional connection or link between the processor and a carrier of the model. In this regard, communication between different elements may be accomplished using an available wired and/or wireless connection, and/or according to any suitable communication (and/or network) standard or protocol. Alternatively or additionally, the data may be indirectly loaded into the image processing apparatus 200. For example, the data may be stored in a suitable machine-readable medium (for example, a flash memory card), and then the medium used to load the data into the image processing apparatus 200 (on site, for example, by a user or an authorized person of the system); or the data may be downloaded into an electronic device (for example, a notebook computer) capable of local communication, and then the device used on site (for example, by the user or the authorized person of the system) to upload the data into the image processing apparatus 200 by means of a direct connection (for example, a USB connector).

As discussed herein, deep learning technology (also referred to as deep machine learning, hierarchical learning, deep structured learning, and so on) employs an artificial neural network for learning. The deep learning method is characterized by using one or more network architectures to extract or simulate data of interest. The deep learning method may be implemented using one or more processing layers (for example, an input layer, an output layer, a convolutional layer, a normalization layer, or a sampling layer, and processing layers of different quantities and functions may exist according to different deep network models), wherein the configuration and number of the layers allow a deep network to process complex information extraction and modeling tasks. Specific parameters (also referred to as a "weight" or "bias") of the network are usually estimated by means of a so-called learning process (or training process). The learned or trained parameters usually result in (or output) a network corresponding to layers of different levels, so that extraction or simulation of different aspects of initial data or the output of a previous layer usually may represent the hierarchical structure or concatenation of layers. During image processing or reconstruction, this may be represented as different layers with respect to different feature levels in the data. Thus, processing may be performed layer by layer. That is, "simple" features may be correspondingly extracted from input data for an earlier or higher-level layer, and then these simple features are combined into a layer exhibiting features of higher complexity. In practice, each layer (or more specifically, each "neuron" in each layer) may process input data into output data for representation using one or more linear and/or non-linear transformations (so-called activation functions). The number of the plurality of "neurons" may be constant among the plurality of layers or may vary from layer to layer. As discussed herein, as part of initial training of a deep learning process to solve a specific problem, a training data set includes a known input value (for example, a sample image or a pixel matrix of an image subjected to coordinate transformation) and an expected (target) output value (for example, an image or an identification and determination result) finally outputted in the deep learning process. In this manner, a deep learning algorithm can (in a supervised or guided manner or an unsupervised or unguided manner) process the training data set until a mathematical relationship between a known input and an expected output is identified and/or a mathematical relationship between the input and output of each layer is identified and represented. In the learning process, (a part of) input data is usually used, and a network output is created for the input data. Afterwards, the created network output is compared with the expected output of the data set, and then the difference between the created and expected outputs is used to iteratively update network parameters (weight and/or bias). A stochastic gradient descent (SGD) method may generally be used to update network parameters. However, those skilled in the art should understand that other methods known in the art may also be used to update network parameters. Similarly, a separate validation data set may be used to validate a trained network, wherein both a known input and an expected output are known. The known input is provided to the trained network so that a network output can be obtained, and then the network output is compared with the (known) expected output to validate prior training and/or prevent overtraining.

Figure 3:
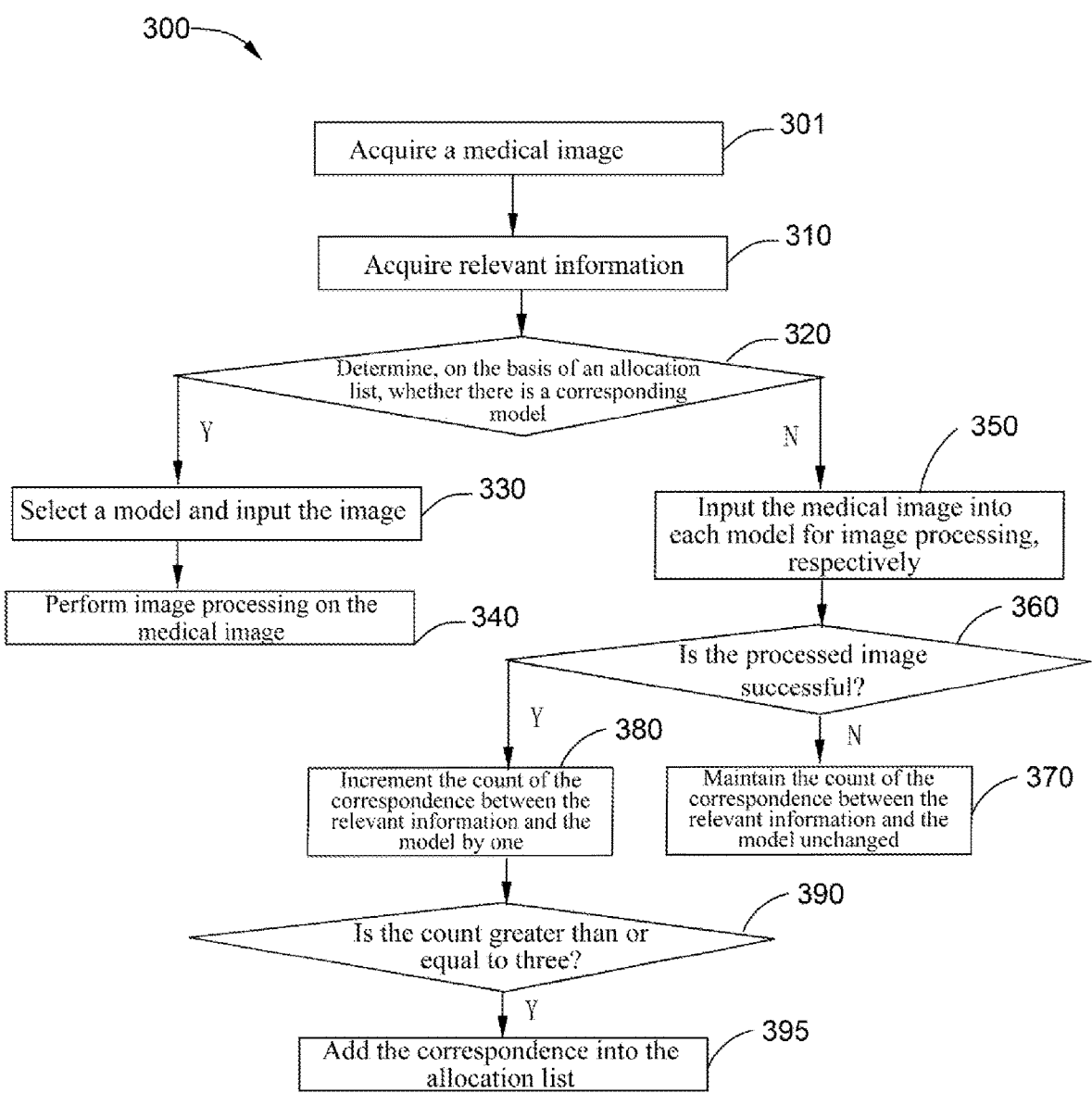
FIG. 3 is a schematic diagram of an operation procedure for image processing according to some embodiments of the present invention.
Figure 4:
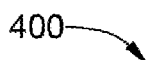
FIG. 4 is a schematic diagram of header file information of a medical image according to some embodiments of the present invention.
Figure 5:
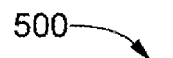
FIG. 5 is a schematic diagram of an allocation list according to some embodiments of the present invention.

FIG. 3 shows a schematic diagram of an operation procedure of an image processing apparatus of some embodiments of the present invention, FIG. 4 shows a schematic diagram of header file information of a medical image of some embodiments of the present invention, and FIG. 5 shows a schematic diagram of an allocation list of some embodiments of the present invention. As shown in FIGS. 3-5, an operation 300 in the image processing apparatus includes the following procedure:

First, a medical image is acquired (301), which may be transmitted from a medical imaging system to the image processing apparatus in a wired or wireless manner, or may be acquired by means of a workstation or a PACS, and, may also be acquired by any other suitable means, for example, by means of an external removable storage apparatus.

Second, the processor is capable of acquiring relevant information of the medical image (310), the relevant information of the medical image including at least one among an imaging device type, a scan site, and a possible disease type.

In some embodiments, the relevant information is information acquired by means of image identification of the medical image, e.g., a scan site acquired by image identification. In some other embodiments, the relevant information is acquired by means of header file DICOM information. Specifically, as shown in FIG. 4, a DICOM file of a medical image typically includes a lot of information, for example, device type, scan site, possible disease type, and the like, wherein device types include CT, MR, X-ray, PET, PET-CT, etc., scan sites include brain, chest, abdomen, lower limb, etc., and possible disease types include brain tumor, pulmonary nodule, etc. In the DICOM file, the relevant information may not be displayed or stored in the form of the above English characters, but may possibly be in the form of Chinese characters or other abbreviations or numbers, for example, "胸部[chest]", etc.

Furthermore, the processor is capable of determining, on the basis of the allocation list, whether there is a learning network model corresponding to the relevant information (320). When a corresponding learning network model is present in the allocation list, the learning network model is selected and the medical image is inputted into the model (330), and corresponding image processing is performed on the medical image (340). Image-processed images can be displayed to the user by means of an external display, may also be stored in the memory of the image processing apparatus, and may also be transmitted to other devices or display interfaces or PACS systems and the like.

In some embodiments, the allocation list includes a list of correspondences between relevant information of medical images and a plurality of learning network models, and the allocation list includes correspondences between imaging device types and scan sites and the plurality of learning network models. Specifically, as shown in FIG. 5, in some non-limiting embodiments, when a "Device type" in an acquired medical image is "MR" and a "Scan Site" is "Chest" or "Lung," then the medical image is inputted into an MR chest processing model; when the "Device type" in the acquired medical image is "CT" and the "Scan site" is "Chest," then the medical image is inputted into a CT chest processing model; when the "Device type" in the acquired medical image is "CT" and the "Scan site" is "Brain," then the medical image is inputted into a CT brain processing model; when the "Device type" in the acquired medical image is "X-ray" and the "Scan site" is "Chest" or "Chest radiograph," then the medical image is inputted into an X-ray chest processing model; and when the "Device type" in the acquired medical image is "X-ray" and the "Scan site" is "Lower limb" or "Bone age," then the medical image is inputted into an X-ray bone age processing model.

In addition to being displayed as "X" [X-ray], the "Device type" may be displayed as "X-ray" or "DXR," and the "brain" may also be displayed as "Cerebrum", "Left-brain" or "Right-brain", etc., and may also be represented by the corresponding Chinese symbols or a code. There is no limitation in this regard, and adaptive modifications may be made according to a naming rule in a scanning protocol in the medical imaging system.

The learning network model is not limited to the 5 types of learning network models shown in FIG. 5, and may include only a few of these types of learning network models, or may also include any other type of learning network model. In addition, the correspondences in the allocation list are not limited to the correspondences shown in the figures; for example, for an MR chest processing model, relevant information corresponding to "MR" and "Spine" may also be associated with the same learning network model, and other suitable correspondences.

When there is only one type of processing for MR images in the learning network model, the allocation list may be set to input all images having a "Device type" of "MR" into the learning network model, without the need for determining the scan site.

The "Possible disease type" information in the DICOM information may also be employed; for example, when the "Possible disease type" is "Brain tumor," a corresponding medical image is inputted into the CT brain processing model. For the "Possible disease type," the device type may be further limited, or the device type may not be limited, and the "Possible disease type" can be employed for allocating image processing.

Considering a situation in which the DICOM information is incomplete or imprecise due to inaccurate or missing information input when the user configures the scanning protocol, the processor is further configured to, when there is no corresponding learning network model in the allocation list, input the medical image into each model and perform image processing separately 350. The processor can then create or add any correspondence between the relevant information and a learning network model in the allocation list on the basis of a preset rule. The preset rule indicates that when processed images outputted by any learning network model are evaluated as successful more than a preset number of times, for example, the number of successes is not less than three times, (i.e., when the number of times that medical images containing certain relevant information are successfully inputted into the same learning network model for image processing is greater than or equal to three), then a correspondence is created in the allocation list, and afterwards, when the relevant information is re-inputted into the image processing apparatus, then the learning network model is selected directly on the basis of the allocation list, and image processing is performed.

Specifically, after the medical image is inputted into each learning network model for image processing, respectively, the processor can then evaluate the image-processed image, i.e., determine whether the processed image is successful (360). In some embodiments, whether the processed image is successful is evaluated on the basis of at least one among image quality evaluation, degree of site matching, and sequence integrity evaluation.

Specifically, image quality evaluation can be used to evaluate the image quality of image-processed images, and can be determined from one or more dimensions, including anatomical structure definition, target site contrast, image signal uniformity, image noise level, and degree of artifact suppression. The image quality evaluation may be carried out on the basis of deep learning, or may be performed on the basis of any other suitable means. Degree of site matching refers to an integrity evaluation of a site after undergoing image segmentation, for example, by detecting a boundary of the segmented site, or on the basis of a contrast or match with a standard scan site model, or on the basis of any other suitable means, the integrity thereof after segmentation can be determined. The sequence integrity evaluation refers to an examination of a sequence of images after having undergone image segmentation so as to evaluate whether the sequence is complete or whether there is an omission or deficiency.

In some embodiments, in addition to being capable of evaluating the image on the basis of one or more metrics among image quality evaluation, degree of site matching and sequence integrity evaluation, the processor is also capable of evaluating the image on the basis of other suitable metrics.

When the processed image is evaluated as successful by the processor, the processor is then capable of adding the correspondence between the relevant information and a learning network model processed successfully into a temporary allocation list, and the count of the correspondence is incremented by one (380). Afterwards, the processor is capable of determining whether the count of correspondences in the temporary allocation list exceeds a preset threshold (390), for example, exceeds 2, and if it exceeds 2, then adding the correspondence in the temporary allocation list into the allocation list (395), and deleting correspondences between the relevant information and other learning network models in the temporary allocation list. If the count of correspondences is not more than 2, then no operation is performed. When the processed image is evaluated as unsuccessful by the processor, then the count of the correspondence between the relevant information and the model remains unchanged, or no relevant operation is performed, or no temporary correspondence is created (370).

In some non-limiting embodiments, taking the allocation list in FIG. 5 as an example, for example, if relevant information of a current medical image A is "CT+Abdomen," i.e., the "Device Type" is "CT" and the "Scan Site" is "Abdomen," then because a learning network model corresponding to "CT+Abdomen" is not present in the allocation list, the processor is capable of inputting the medical image A into each learning network model. Since a CT image is defined in the relevant information of the medical image A, the processor may also input the medical image A into only a CT chest processing model and a CT brain processing model, and use these two learning network models to separately process the medical image, so as to obtain an image B that has been processed by the CT chest processing model and an image C that has been processed by the CT brain processing model. The processor is capable of evaluating each of the image B and the image C, for example, if the image B is evaluated as successful in terms of image processing. Then, the processor creates a temporary allocation list to show entries of the above correspondences, for example:

| Relevant Information | Learning Network Model | Count |
|---|---|---|
| CT + Abdomen | CT Chest Processing Model | 1 |
| CT + Abdomen | CT Brain Processing Model | 0 |

Afterwards, when relevant information in a medical image D is also shown as "CT+Abdomen," then the processor also inputs the medical image D into the CT chest processing model and the CT brain processing model for image processing, respectively, and increments the count of the relevant correspondence by 1. When the count of the correspondence between "CT+Abdomen" and "CT Chest Processing Model" is greater than or equal to 3, the processor adds the correspondence between "CT+Abdomen" and "CT Chest Processing Model" into the allocation list shown in FIG. 5, and deletes the correspondence between "CT+Abdomen" and "CT Brain Processing Model."

The temporary allocation list may be created temporarily in the original allocation list, or may be separately created and stored. The temporary allocation list may also display only entries for which the count is incremented by one, and for a correspondence for which image processing is evaluated as unsuccessful, an entry is not added or displayed, for example:

| Relevant Information | Learning Network Model | Count |
|---|---|---|
| CT + Abdomen | CT Chest Processing Model | 1 |

In some embodiments, when relevant information of a medical image E includes only the scan site and shows only "Abdomen", then the processor cannot determine by what device type the image was obtained, and then directly inputs the medical image E into all of the learning network models for image processing, and separately carries out evaluation.

In some embodiments, when a certain device type corresponds only to one kind of learning network model, for example, for MR images, only one kind of learning network model is present, that is an MR brain processing model, then the processor can be configured to input all images having the device type "MR" in the relevant information into the MR brain processing model for image processing.

Figure 6:
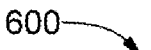
FIG. 6 is a flowchart of a method for allocating image processing according to some embodiments of the present invention.

FIG. 6 shows a flowchart of a method for allocating image processing 600 according to some embodiments of the present invention. As shown in FIG. 6, the method for allocating image processing 600 includes step 610 and step 620.

In step 610, on the basis of relevant information of a medical image, a learning network model corresponding to the information is selected from a plurality of learning network models according to an allocation list, the allocation list including a list of correspondences between relevant information of medical images and the plurality of learning network models.

Specifically, the relevant information of the medical image includes at least one among an imaging device type, a scan site, and a possible disease type. Acquisition of the scan site includes image recognition of the medical image or extraction of DICOM information of the medical image.

The allocation list includes correspondences between imaging device types and scan sites and the plurality of learning network models, and selecting the learning network model includes selecting a corresponding learning network model on the basis of the imaging device type and scan site of the medical image.

The plurality of learning network models are capable of performing image processing on different types of medical images, for example, CT images, MR images, X-ray images, and the like, respectively. The plurality of learning network models can be used to perform at least one among image segmentation, image optimization, and image rendering on an image.

The plurality of learning network models include at least two among n CT models, m MR models, and t X-ray models, wherein the n CT models are configured to perform image processing on n scan sites in a CT image, respectively, the m MR models are configured to perform image processing on m scan sites in an MR image, respectively, the t X-ray models are configured to perform image processing on t scan sites in an X-ray image, respectively, and n, m and t are integers.

In step 620, image processing is performed on the medical image on the basis of the selected learning network model.

Specifically, the learning network model is capable of performing image processing, for example, image segmentation, on the medical image, so as to identify lesions and assist diagnosis.

FIG. 7 shows a flowchart of a method for allocating image processing 700 according to some other embodiments of the present invention. Unlike the method for allocating image processing 600 shown in FIG. 6, the method for allocating image processing 700 further includes a determination step to determine whether the relevant information of the medical image has a corresponding learning network model in the allocation list, and when any piece of relevant information has no corresponding learning network model in the allocation list, a correspondence between the relevant information and a learning network model is created in the allocation list on the basis of a preset rule. Specifically, the preset rule includes that processed images outputted by any learning network model are evaluated as successful more than a preset number of times. Specifically, the method includes step 730, step 740 and step 750.

In step 730, the medical image is inputted into each learning network model for image processing, respectively.

In some embodiments, according to the imaging device type in the DICOM information of the medical image, the medical image is inputted into one or more learning network models corresponding to the imaging device type. In some other embodiments, when the imaging device type in the DICOM information is missing, then the medical image is inputted into each learning network model for image processing, respectively.

In step 740, when a processed image outputted by any learning network model is successful, then a temporary correspondence between the relevant information and the learning network model is created, and the count is incremented by one.

Specifically, the image-processed image is evaluated, that is, whether the processed image is successful is determined. In some embodiments, whether the processed image is successful is evaluated on the basis of at least one among image quality evaluation, degree of site matching, and sequence integrity evaluation.

In some embodiments, a correspondence between the relevant information and each learning network model is created in a temporary allocation list, and after evaluation, the count of the correspondence for which the learning network model is evaluated as successful is incremented by one, and other counts remain unchanged. In some other embodiments, after the image is evaluated, the correspondence between the relevant information and the successful learning network model is added or created in the temporary allocation list, and other correspondences are not added.

In some embodiments, in addition to creating the temporary allocation list and carrying out recording by increasing the count, other suitable means can be employed for recording.

In step 750, when the count of the temporary correspondence reaches a preset value, a new correspondence between the relevant information and the learning network model is created in the allocation list.

In some non-limiting embodiments, when the count of the temporary correspondence is greater than or equal to three, a correspondence is created in the allocation list. The preset count is not limited to 3, and may also be set to any number of times, such as, set higher, so that the matching relationship is more precise, or set lower so as to reduce the computing amount or effort of the processor.

Once the new correspondence is added into the allocation list, and when the newly added relevant information is present in a subsequent medical image, the medical image is directly allocated to a corresponding learning network model for image processing according to the allocation list.

With regard to the method for allocating image processing and the image processing apparatus proposed by the present invention, first, a plurality of learning network models are loaded in the image processing apparatus, so as to perform different kinds of image processing on a medical image, or perform the same or different image processing on different types of medical images. Second, an image processing apparatus that is independent of a medical imaging system is provided, which can perform different types of processing on the medical image, and is capable of not occupying the scan time of the medical imaging system, and can improve scanning efficiency and increase the number of scans per day. Furthermore, an allocation method is configured in the image processing apparatus, the medical image is allocated to each learning network model, and a correspondence with the count that the image processing is evaluated as successful exceeds a preset value is added or created into the allocation list, so as to perform image processing when the relevant information of the medical image is imprecise or missing.

The present invention may further provide a non-transitory computer-readable storage medium, which is used for storing an instruction set and/or a computer program. When executed by a computer, the instruction set and/or computer program causes the computer to perform the above method for allocating image processing. The computer executing the instruction set and/or computer program may be a computer of a medical imaging system, or may be another apparatus/module of the medical imaging system. In one embodiment, the instruction set and/or computer program may be programmed into a processor/controller of the computer.

Specifically, when executed by the computer, the instruction set and/or computer program causes the computer to: on the basis of relevant information of a current medical image, select, according to an allocation list, a learning network model corresponding to the information from a plurality of learning network models, the allocation list including a list of correspondences between relevant information of medical images and the plurality of learning network models; and perform image processing on the medical image on the basis of the selected learning network model.

The instructions described above may be combined into one instruction for execution, and any of the instructions may also be split into a plurality of instructions for execution. Moreover, the present invention is not limited to the instruction execution order described above.

As used herein, the term "computer" may include any processor-based or microprocessor-based system, which includes a system that uses a microcontroller, a reduced instruction set computer (RISC), an application-specific integrated circuit (ASIC), a logic circuit, and any other circuit or processor capable of performing the functions described herein. The examples above are exemplary only and are not intended to limit the definition and/or meaning of the term "computer" in any way.

The instruction set may include various commands used to instruct the computer serving as a processing machine or the processor to perform specific operations, for example, methods and processes of various embodiments. The instruction set may be in the form of a software program that may form part of one or more tangible, non-transitory computer readable media. The software may be in various forms of, for example, system software or application software. Furthermore, the software may be in the form of a standalone program or a collection of modules, a program module within a larger program, or part of a program module. The software may also include modular programming in the form of object-oriented programming. Processing of input data by the processing machine may be in response to an operator command, or in response to a previous processing result, or in response to a request made by another processing machine.

An exemplary embodiment of the present invention provides a method for allocating image processing, comprising: on the basis of relevant information of a medical image, selecting, according to an allocation list, a learning network model corresponding to the information from a plurality of learning network models, the allocation list comprising a list of correspondences between relevant information of medical images and the plurality of learning network models; and performing image processing on the medical image on the basis of the selected learning network model.

Specifically, the relevant information of the medical image can include at least one among an imaging device type, a scan site and a possible disease type.

Specifically, acquisition of the scan site can include image recognition of the medical image or extraction of header file information of the medical image.

Specifically, the allocation list can include correspondences between imaging device types and scan sites and the plurality of learning network models, and selecting the learning network model can include selecting a corresponding learning network model on the basis of the imaging device type and the scan site.

Specifically, the plurality of learning network models can include at least two among n CT models, m MR models, and t X-ray models, wherein the n CT models are configured to perform image processing on n scan sites in a CT image, respectively, the m MR models are configured to perform image processing on m scan sites in an MR image, respectively, the t X-ray models are configured to perform image processing on t scan sites in an X-ray image, respectively, and n, m and t are integers.

Specifically, the plurality of learning network models can be used to perform at least one among image segmentation, image optimization and image rendering on an image.

Specifically, the method for allocating image processing can further include determining whether the relevant information of the medical image has a corresponding learning network model in the allocation list.

Specifically, when any piece of relevant information has no corresponding learning network model in the allocation list, a correspondence between the relevant information and a learning network model is created in the allocation list on the basis of a preset rule.

Specifically, the preset rule includes that processed images outputted by any learning network model are evaluated as successful more than a preset number of times.

Specifically, whether the processed image is successful is evaluated on the basis of at least one among image quality evaluation, degree of site matching, and sequence integrity evaluation.

Specifically, creating a new correspondence between the relevant information and the learning network model on the basis of the preset rule can include: inputting the medical image into each learning network model for image processing, respectively; when a processed image outputted by any learning network model is evaluated as successful, creating a temporary correspondence between the relevant information and the learning network model, and incrementing a count by one; and when the count of the temporary correspondence reaches a preset value, creating a new correspondence between the relevant information and the learning network model in the allocation list.

An exemplary embodiment of the present invention further provides a non-transitory computer-readable storage medium, which is used for storing a computer program that, when executed by a computer, causes the computer to perform instructions which include: on the basis of relevant information of a medical image, selecting, according to an allocation list, a learning network model corresponding to the information from a plurality of learning network models, the allocation list including a list of correspondences between relevant information of medical images and the plurality of learning network models; and performing image processing on the medical image on the basis of the selected learning network model.

Specifically, the instructions further include identifying the medical image to acquire a scan site of the medical image.

Specifically, the instructions further include extracting header file information of the medical image to acquire at least one among an imaging device type, a scan site and a possible disease type.

Specifically, the instructions further include selecting a corresponding learning network model on the basis of the imaging device type and the scan site.

Specifically, the instructions further include determining whether the relevant information of the medical image has a corresponding learning network model in the allocation list.

Specifically, the instructions further include when any piece of relevant information has no corresponding learning network model in the allocation list, creating a correspondence between the relevant information and the learning network model in the allocation list on the basis of a preset rule.

Specifically, the preset rule includes that processed images outputted by any learning network model are evaluated as successful more than a preset number of times.

Specifically, the instructions further include: evaluating whether a processed image is successful on the basis of at least one among image quality evaluation, degree of site matching and sequence integrity evaluation.

Specifically, the instructions further include: inputting the medical image into each learning network model for image processing, respectively; when a processed image outputted by any learning network model is evaluated as successful, creating a temporary correspondence between the relevant information and the learning network model, and incrementing a count by one; and when the count of the temporary correspondence reaches a preset value, creating a new correspondence between the relevant information and the learning network model in the allocation list.

An exemplary embodiment of the present invention further provides an image processing apparatus, comprising: a plurality of learning network models, a memory, and a processor, the plurality of learning network models being configured to perform image processing on a medical image, the memory being configured to store an allocation list comprising a list of correspondences between relevant information of medical images and the plurality of learning network models, the processor being configured to, on the basis of the relevant information of the medical image, select, according to the allocation list, a learning network model corresponding to the information from the plurality of learning network models, and perform image processing on the medical image on the basis of the selected learning network model.

Specifically, the relevant information of the medical image includes at least one among an imaging device type, a scan site and a possible disease type.

Specifically, the processing can acquire the relevant information of the scan site on the basis of image recognition of the medical image or by extracting header file information of the medical image.

Specifically, the allocation list includes correspondences between imaging device types and scan sites and the plurality of learning network models, and the selecting learning network model includes selecting a corresponding learning network model on the basis of the imaging device type and the scan site.

Specifically, the plurality of learning network models include at least two among n CT models, m MR models, and t X-ray models, wherein the n CT models are configured to perform image processing on n scan sites in a CT image, respectively, the m MR models are configured to perform image processing on m scan sites in an MR image, respectively, the t X-ray models are configured to perform image processing on t scan sites in an X-ray image, respectively, and n, m and t are integers.

Specifically, the plurality of learning network models can be used to perform at least one among image segmentation, image optimization and image rendering on an image.

Specifically, the processor can be further configured to determine whether the relevant information of the medical image has a corresponding learning network model in the allocation list.

Specifically, when any piece of relevant information has no corresponding learning network model in the allocation list, the processor is capable of creating correspondence between the relevant information and the learning network model in the allocation list on the basis of a preset rule.

Specifically, the preset rule includes that processed images outputted by any learning network model are evaluated as successful more than a preset number of times.

Specifically, the processor is capable of evaluating whether a processed image is successful on the basis of at least one among image quality evaluation, degree of site matching and sequence integrity evaluation.

Specifically, the processor is further configured to input the medical image into each learning network model for image processing, respectively; when a processed image outputted by any learning network model is evaluated as successful, create a temporary correspondence between the relevant information and the learning network model, and increment a count by one; and when the count of the temporary correspondence reaches a preset value, create a new correspondence between the relevant information and the learning network model in the allocation list.

Some exemplary embodiments have been described above; however, it should be understood that various modifications may be made. For example, suitable results can be achieved if the described techniques are performed in a different order and/or if components in the described systems, architectures, devices, or circuits are combined in different ways and/or replaced or supplemented by additional components or equivalents thereof. Accordingly, other implementations also fall within the scope of protection of the claims.

What is claimed is:

1. A method for allocating image processing, comprising:
on the basis of relevant information of a current medical image, selecting, according to an allocation list, a learning network model corresponding to the relevant information from a plurality of learning network models, the allocation list comprising a list of correspondences between relevant information of medical images and the plurality of learning network models, wherein, in response to detecting that a piece of relevant information has no corresponding learning network model in the allocation list, creating a correspondence between the relevant information and a learning network model in the allocation list on the basis of a preset rule by:
providing the medical image as input into each learning network model for image processing;
for each processed image generated as output by a learning network model that is evaluated as successful, creating a temporary correspondence between the relevant information and the learning network model, and incrementing a count; and
in response to the count of the temporary correspondence reaching a preset value, creating a new correspondence between the relevant information and the learning network model in the allocation list; and
performing image processing on the current medical image on the basis of the selected learning network model.

2. The method for allocating image processing according to claim 1, wherein the relevant information of the medical image comprises at least one among an imaging device type, a scan site and a possible disease type.

3. The method for allocating image processing according to claim 2, wherein acquisition of the scan site comprises image recognition of the medical image or extraction of header file information of the medical image.

4. The method for allocating image processing according to claim 2, wherein the allocation list comprises correspondences between imaging device types and scan sites, and the plurality of learning network models, and selecting the learning network model comprises selecting a corresponding learning network model on the basis of the imaging device type and the scan site.

5. The method for allocating image processing according to claim 1, wherein the plurality of learning network models comprises at least two among a number n of CT models, a number m of MR models, and a number t of X-ray models, the n CT models being configured to perform image processing on n scan sites in a CT image, respectively, the m MR models being configured to perform image processing on m scan sites in an MR image, respectively, and the t X-ray models being configured to perform image processing on t scan sites in an X-ray image, respectively, n, m and t being integers.

6. The method for allocating image processing according to claim 1, wherein the plurality of learning network models are used to perform at least one among image segmentation, image optimization and image rendering on an image.

7. The method for allocating image processing according to claim 1, further comprising: determining whether the relevant information of the medical image has a corresponding learning network model in the allocation list.

8. The method for allocating image processing according to claim 1, wherein the preset rule comprises that a processed image outputted by any learning network model is evaluated as successful more than a preset number of times.

9. The method for allocating image processing according to claim 8, wherein whether the processed image is successful is evaluated on the basis of at least one among image quality evaluation, site matching degree and sequence integrity evaluation.

10. A non-transitory computer-readable storage medium, which is used to store a computer program that, when executed by a computer, causes the computer to:
on the basis of relevant information of a current medical image, select, according to an allocation list, a learning network model corresponding to the relevant information from a plurality of learning network models, the allocation list comprising a list of correspondences between relevant information of medical images and the plurality of learning network models, wherein, in response to detecting that a piece of relevant information has no corresponding learning network model in the allocation list, creating a correspondence between the relevant information and a learning network model in the allocation list on the basis of a preset rule by:
providing the medical image as input into each learning network model for image processing;
for each processed image generated as output by a learning network model that is evaluated as successful, creating a temporary correspondence between the relevant information and the learning network model, and incrementing a count; and
in response to the count of the temporary correspondence reaching a preset value, creating a new correspondence between the relevant information and the learning network model in the allocation list; and
perform image processing on the current medical image on the basis of the selected learning network model.

11. The non-transitory computer-readable storage medium for allocating image processing according to claim 10, wherein the relevant information of the medical image comprises at least one among an imaging device type, a scan site and a possible disease type.

12. The non-transitory computer-readable storage medium for allocating image processing according to claim 11, wherein acquisition of the scan site comprises image recognition of the medical image or extraction of header file information of the medical image.

13. The non-transitory computer-readable storage medium for allocating image processing according to claim 11, wherein the allocation list comprises correspondences between imaging device types and scan sites, and the plurality of learning network models, and selecting the learning network model comprises selecting a corresponding learning network model on the basis of the imaging device type and the scan site.

14. The non-transitory computer-readable storage medium for allocating image processing according to claim 10, wherein the plurality of learning network models comprises at least two among a number n of CT models, a number m of MR models, and a number t of X-ray models, the n CT models being configured to perform image processing on n scan sites in a CT image, respectively, the m MR models being configured to perform image processing on m scan sites in an MR image, respectively, and the t X-ray models being configured to perform image processing on t scan sites in an X-ray image, respectively, n, m and t being integers.

15. The non-transitory computer-readable storage medium for allocating image processing according to claim 10, wherein the plurality of learning network models are used to perform at least one among image segmentation, image optimization and image rendering on an image.

16. An image processing apparatus, comprising:
a plurality of learning network models used to perform image processing on a medical image;
a memory used to store an allocation list comprising a list of correspondences between relevant information of medical images and the plurality of learning network models;
and a processor configured to:
on the basis of relevant information of a medical image, select, according to the allocation list, a learning network model corresponding to the relevant information from the plurality of learning network models, wherein, in response to detecting that a piece of relevant information has no corresponding learning network model in the allocation list, creating a correspondence between the relevant information and a learning network model in the allocation list on the basis of a preset rule by:
providing the medical image as input into each learning network model for image processing;
for each processed image generated as output by a learning network model that is evaluated as successful, creating a temporary correspondence between the relevant information and the learning network model, and incrementing a count; and
in response to the count of the temporary correspondence reaching a preset value, creating a new correspondence between the relevant information and the learning network model in the allocation list; and
perform image processing on the medical image on the basis of the selected learning network model.

17. The image processing apparatus for allocating image processing according to claim 16, wherein the relevant information of the medical image comprises at least one among an imaging device type, a scan site and a possible disease type.

18. The image processing apparatus for allocating image processing according to claim 17, wherein acquisition of the scan site comprises image recognition of the medical image or extraction of header file information of the medical image.

* * * * *